US 6,582,773 B2

(12) United States Patent
Brynolf

(10) Patent No.: US 6,582,773 B2
(45) Date of Patent: Jun. 24, 2003

(54) METHOD AND APPARATUS FOR TREATING SUBSTRATE PLASTIC PARTS TO ACCEPT PAINT WITHOUT USING ADHESION PROMOTERS

(75) Inventor: Russell Brynolf, Howell, MI (US)

(73) Assignee: FTS, L.L.C., Flint, MT (US)

( * ) Notice: Subject to any disclaimer, the term of this patent is extended or adjusted under 35 U.S.C. 154(b) by 33 days.

(21) Appl. No.: 09/836,659

(22) Filed: Apr. 17, 2001

(65) Prior Publication Data

US 2003/0087041 A1 May 8, 2003

(51) Int. Cl.$^7$ .............................. B05D 1/02; B05D 3/08; B32B 31/14; B29C 47/00; B29C 35/02
(52) U.S. Cl. ..................... 427/422; 427/421; 427/227; 427/226; 156/82; 156/245; 264/294; 264/80; 264/602
(58) Field of Search ................................ 427/421, 422, 427/424, 425, 427, 446, 447, 448, 133, 207.1, 208.2, 223, 224, 226, 229, 301, 302, 402, 407.1, 412.1, 417; 118/300, 302, 313, 315, 323; 264/600, 602, 80, 294, 241; 156/82, 245

(56) References Cited

U.S. PATENT DOCUMENTS

| | | |
|---|---|---|
| 3,418,066 A | 12/1968 | Caldwell et al. |
| 3,813,212 A | 5/1974 | Shofner et al. |
| 4,130,388 A | 12/1978 | Flanagan |

(List continued on next page.)

FOREIGN PATENT DOCUMENTS

| | | |
|---|---|---|
| FR | 2299094 A | 8/1976 |
| FR | 2785834 A | 5/2000 |
| JP | Sho 56-16175 | 4/1981 |

OTHER PUBLICATIONS

"Surface Grafting of Polyethyleneoxide Optimized by Means of ESCA" by E. Kiss, C–G. Golander and J.C. Eriksson, from Progress in Colloid & Polymer Science, Progr Colloid & Polymer Sci 74:113–119 (1987).

"Plasma Processing of Materials: Scientific Opportunities and Technological Challenges", National Academy Press, Washington, D.C. (1991).

"Plasma Modification of Polymer Surfaces", F.D. Egitto and L.J. Matienzo, IBM Corporation, Endicott, NY, Society of Vacuum Coaters, 38th Annual Technical Conference Proceedings, (1993) 1–878068–12–1.

PCT International Search Report—Full Document.

Connell, LD: "Beflammen Als Oberflaechenbehandlung Bei Thermoplastichen Kunstoffen" Kunstoffe, Carl Hanser Verlag, Munchen, DE vol. 76 No. 8, 1986, pp. 671–674, XP002067804 ISSN: 0023–5563 Full Document.

*Primary Examiner*—Shrive P. Beck
*Assistant Examiner*—Eric B. Fuller
(74) *Attorney, Agent, or Firm*—Welsh & Katz, Ltd.

(57) ABSTRACT

A method and device of treating an irregularly shaped article to prepare the article for painting is provided. The device includes a burner which can produce an adjustable flame tongue which can fit into crevices, openings and other irregular topographical features of an item to be painted or otherwise coated. The burner device further provides means to apply a grafting chemical on a freshly oxidized surface. Further, the invention provides means to colorize treated objects so that they may be recognized as having been treated. In another embodiment, the grafting chemicals may be enhanced with electrolytic solutions such that electrostatic methods of painting may be subsequently employed on the item. In an alternate embodiment, the burner is adapted to spray a powder inside of a generally enclosed flame, and is used in conjunction with chop guns to manufacture glass or carbon fiber preforms.

15 Claims, 6 Drawing Sheets

U.S. PATENT DOCUMENTS

| | | |
|---|---|---|
| 4,976,607 A | 12/1990 | Grimard |
| 5,132,108 A | 7/1992 | Narayanan et al. |
| 5,244,654 A | 9/1993 | Narayanan |
| 5,753,754 A | 5/1998 | Strobel et al. |
| 5,900,282 A * | 5/1999 | Collins et al. .............. 427/447 |
| 5,922,161 A * | 7/1999 | Wu et al. ................ 156/272.6 |
| 5,932,293 A * | 8/1999 | Belashchenko et al. ..... 427/446 |
| 6,116,893 A | 9/2000 | Peach |
| 6,273,345 B1 * | 8/2001 | Kaligian, II et al. ..... 239/419.3 |
| 6,355,099 B1 * | 3/2002 | Immordino et al. ........ 106/778 |
| 2002/0018860 A1 * | 2/2002 | Filippou et al. ............ 427/532 |
| 2002/0053379 A1 * | 5/2002 | Tokas et al. ............. 152/209.6 |

* cited by examiner

FIG. 3A
PRIOR ART
FIG. 3B
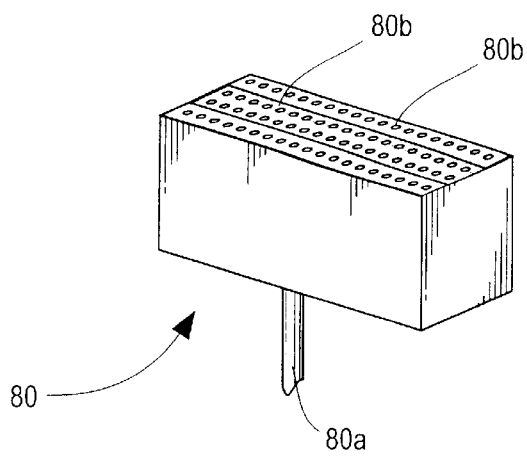
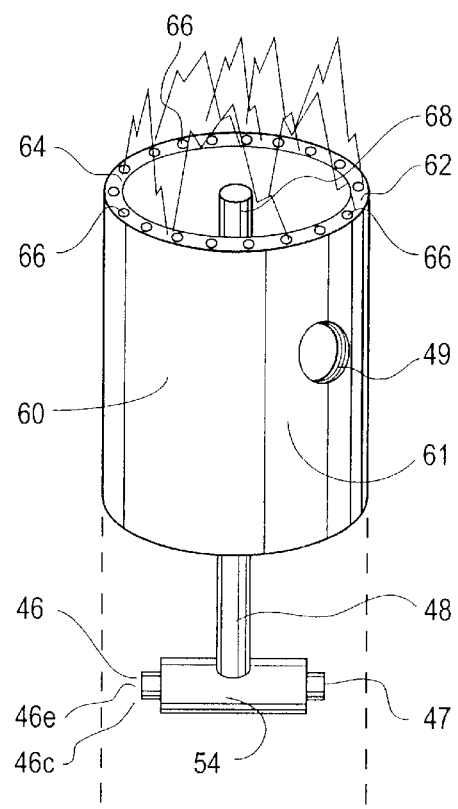

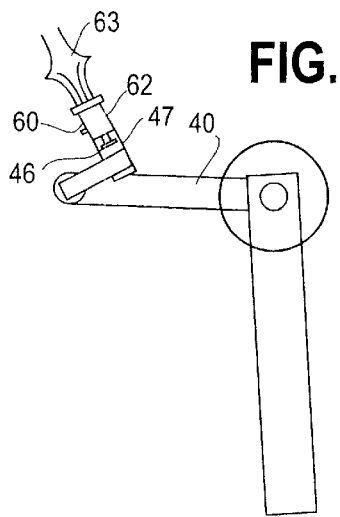
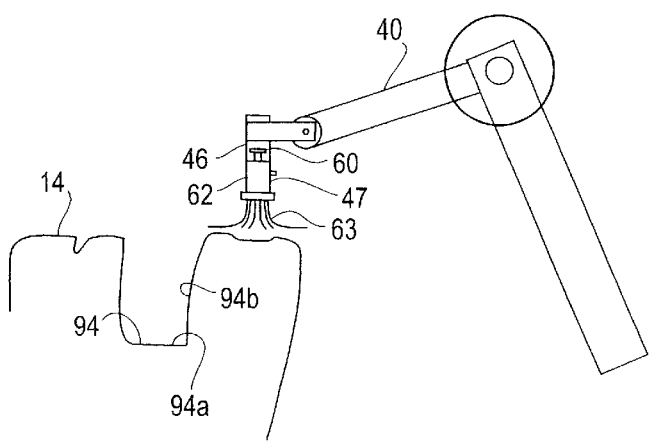
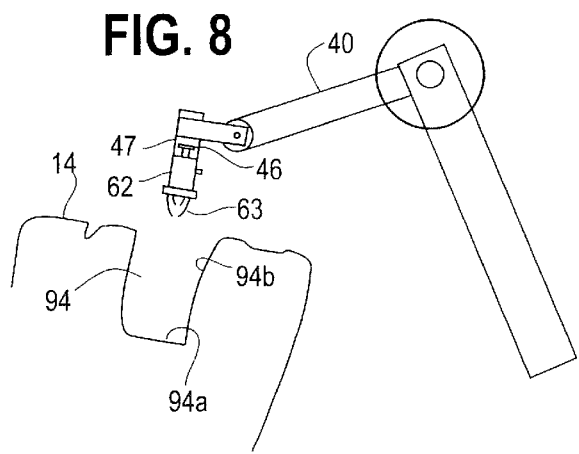
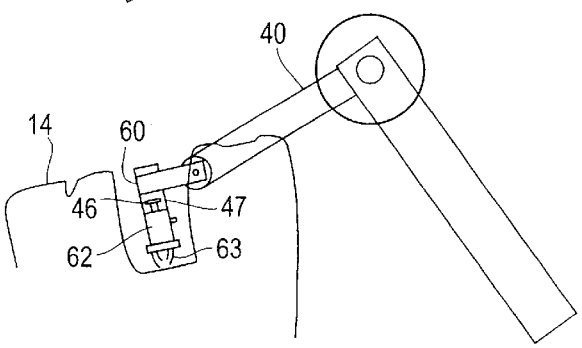
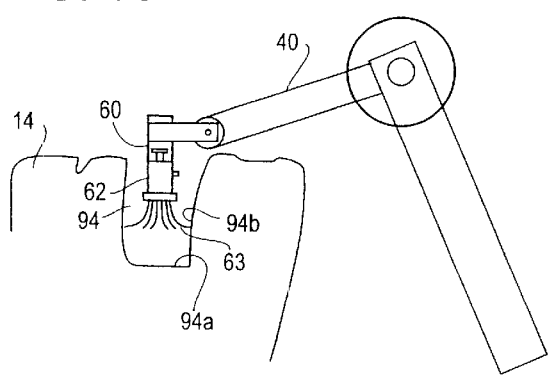

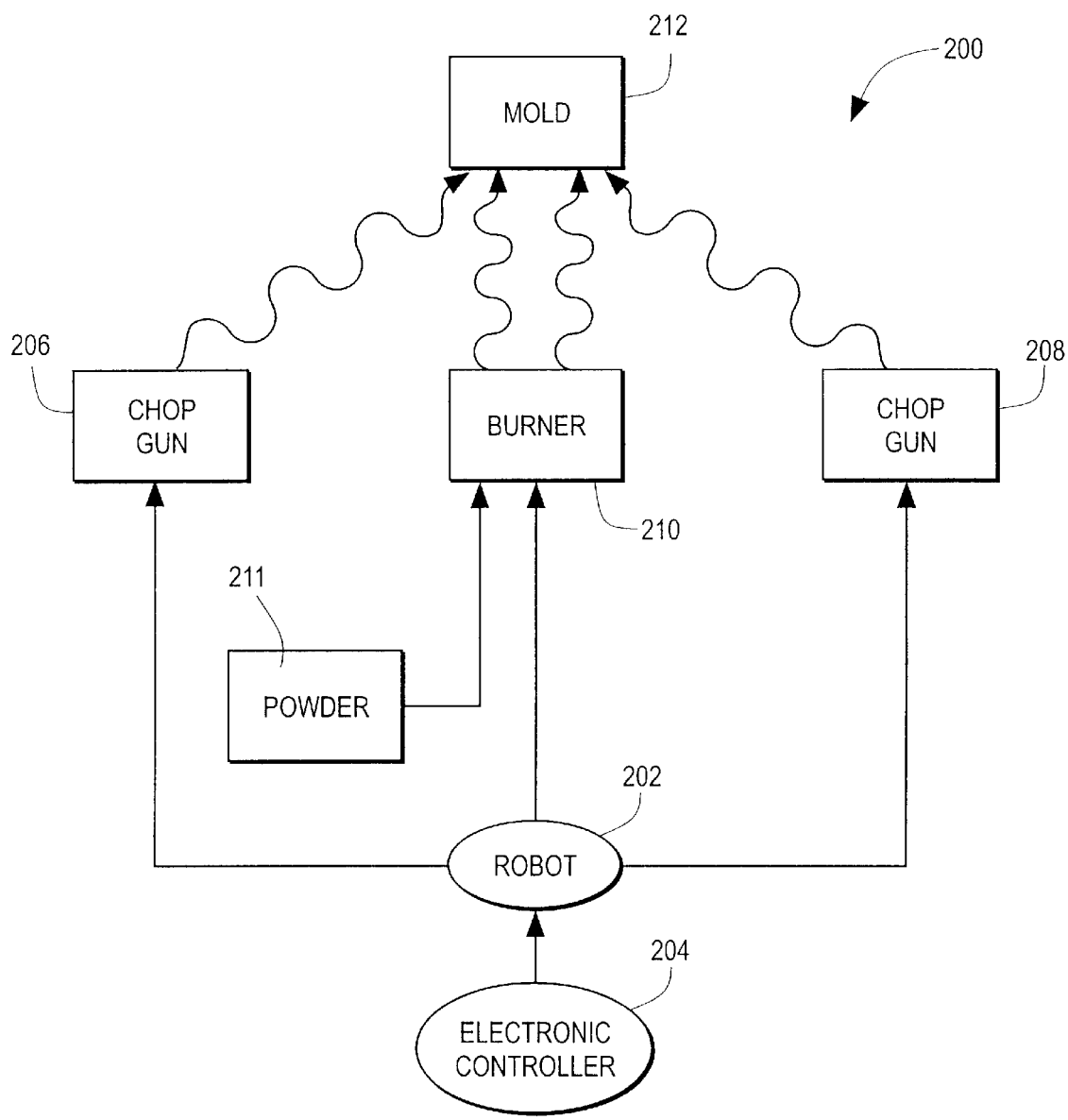

METHOD AND APPARATUS FOR TREATING SUBSTRATE PLASTIC PARTS TO ACCEPT PAINT WITHOUT USING ADHESION PROMOTERS

FIELD OF THE INVENTION

The present invention generally relates to methods and apparatus' for treating plastic substrate parts to accept paint and, more particularly, to a method and apparatus for treating plastic substrate parts to accept paint without using adhesion promoters that allows plastic substrate parts having flat regions, undulations, and recesses to be properly treated.

BACKGROUND OF THE INVENTION

In the art and science of painting, it is a practice to prepare a surface that is to be painted to receive paint. A surface properly prepared is more likely to produce a desirable result and remain properly painted for a long term. Preparation techniques vary depending on the material to be painted, the type of primer, stain and/or paint which will be used, the manner of application of the paint and the conditions to which the painted item will be subjected, among others.

In the past, with respect to automobiles and automobile parts, plastic played a minor role and typically could be prepared such that the plastic part was molded in the desired color. As plastic has become a more important product in the automobile industry, such items as interior and exterior door, dashboard and other body panels and protective equipment, such as bumpers and door guards, have been made of a plastic material. Typically, exterior plastic parts, especially in modern vehicles, are painted to match or aesthetically contrast, with the body of the automobile.

In order to speed production of parts, and reduce costs, plastic parts are now typically molded in one color (such that only a single run of molding is needed for all colors offered a vehicle model) and then painted to match the desired vehicle color. This allows for less planning and more availability of parts for all colors of a vehicle model, and typically greater numbers of color combinations to appeal to the tastes of purchasers. Further, this manner of producing parts allows an adequate supply of replacement parts for subsequent body repair needs on any color vehicle.

A problem arises, however, in producing painted parts, in that plastic material, used body parts, typically must have a smooth surface in order to be acceptable. Smooth surfaces are typically not amenable to painting. Paint sprayed, or otherwise placed, on smooth surfaces, especially those with low surface energies, generally does not stick to the surface and may be peeled or chipped off, which is a highly commercially undesirable result. While various means have been provided to stem this problem, such as abrading the surface prior to painting or adding adhesives, such as epoxy, to paint, in or to get the paint to stick to the item being painted, these has proved effective.

It has been found that the use of a grafting material, such as those in a family of multifuntional amine-containing organic compounds, on plastic parts, which have been oxidized, allows paint to better adhere to the plastic. See, for example, U.S. Pat. No. 5,922,161 to Wu et al. (the "'161 patent") that discloses a method of modifying or tailoring the surface of polymers and or polymer-based materials to control surface and interface chemistry and molecular structure. The '161 patent discloses a method for oxidizing the surface of a polymer and treating the surface with a grafting chemical. The content of the '161 patent is incorporated by reference into this application as if fully set forth herein.

It has been found, however, procedures which employ the use of grafting chemicals added to plastic parts which have been oxidized are typically only generally applicable to sheets of plastic Further, the devices and methods used to oxidize the plastic and apply the chemical to sheets of plastic typically do so in such manner as to cause areas of the plastic sheet to be treated more than once, because of inadvertent overlapping, wasting chemicals, causing the loss of production time and weakening the over treated areas.

In one plastic sheet treating operation, a gas/air burner, having a large area with many burner ports, and comprising means to spray grafting chemicals onto areas of plastic with have been flame treated by the burner, is used. The burner and grafting chemical sprayer device is moved over the plastic sheet, overlapping some sections of the sheet in movement. In the operation of such a system, the burner oxidizes the plastic sheet and the grafting chemical is sprayed onto the oxidized plastic, to prepare the plastic for further processing, such as with paint, adhesives or other coatings. The sheet is thereby made amenable to adhesion by other chemicals, including paint.

However, plastic parts typically are not made in the form of plastic sheets, especially in automobile applications. Plastic parts are generally constructed in all shapes and with undulation, indentations, openings, crevices and other contours. The use of such treatment devices and methods, as described above, are ineffective to treat the variations in modern plastic parts. Further, treatments such as dipping or spraying have been found to be ineffective as the oxidation process cannot pre-treat the non-linear sections of the plastic part, causing the sprayed grafted material to be wasted.

Further, it has been found that the use of prior treating apparatus often cause large number of toxic chemicals to be released into the atmosphere as a result of the shot-gun approach to the treatment of plastics. This is especially the case when adhesion promoters are utilized to prepare a plastic substrate part to accept paint.

Another problem that exists in present plastic part treatment methods is that once the part is treated it is typically difficult, without sophisticated tests, to discern a difference between the treated part and an untreated part. In many instances, items that have been treated have been confused with items which have not been treated, causing a waste of materials and time in retreating, and generally, an over weakening of the surface of the part which is re-treated.

SUMMARY OF THE INVENTION

I have discovered and invented a method and apparatus for treating plastic substrate part to accept paint without using adhesion promoters that allows all undulations, indentation, openings, crevices and other contours in the plastic substrate parts to be effectively treated. In accordance with one aspect of my invention, I have designed a unique burner device that allows a desired portion of a substrate plastic part to be flame treated and sprayed with a graft chemical at substantially the same time thereby allowing adhesion of paint, or other coatings, to the part.

Such a method and apparatus has a number of distinct advantages. First, plastic substrate parts of all shapes and sizes can be prepared to accept paint. Second, the method disclosed herein is practiced in an environmentally friendly manner. For example, all of the environmentally deleterious effects associated with utilizing adhesion promoters such as, for example, the discharge of the active solvent utilized in typical adhesion promoters are completely eliminated. This allows, for example, the manufacturer's capital costs to be reduced because, for example, there is reduced need for abatement systems that reduce the discharge of solvents to the atmosphere.

Third, this method and apparatus is suitable for use in large, commercial scale applications. For example, in accordance with one embodiment of the present invention, a plastic bumper beam can be treated to accept paint in approximately forty (40) seconds per part. Fourth, the use of this method and apparatus significantly reduces over-spray so that smaller amounts of graft chemicals can be utilized.

Other objects and advantages of the present invention will become apparent as the description proceeds.

BRIEF DESCRIPTION OF THE DRAWINGS

FIG. 3a is a perspective view of a burner of the prior art;

FIG. 3b is a perspective view of a burner in accordance with one embodiment of the present invention;

FIG. 6 is a perspective view of the arm of a robot treatment, equipped with the burner of FIG. 3c being used on an item to be treated;

FIG. 7 is a perspective view of the arm and burner of FIG. 6 shown treating the flat portion of an item to be treated;

FIG. 8 is a perspective view of the arm and burner of FIG. 6 shown being readied to treat an indentation in an item to be treated;

FIG. 9 is a perspective view of the arm and burner of FIG. 6 shown lowered into an indentation on a first pre-treatment inter-cavity position;

FIG. 10 is a perspective view of the arm and burner of FIG. 6 shown in treating the walls of the indentation of the item to be treated; and FIG. 11 is a schematic view of an apparatus that is used to manufacture glass fiber preforms.

DETAILED DESCRIPTION OF AN ILLUSTRATIVE EMBODIMENT

Figure 1:
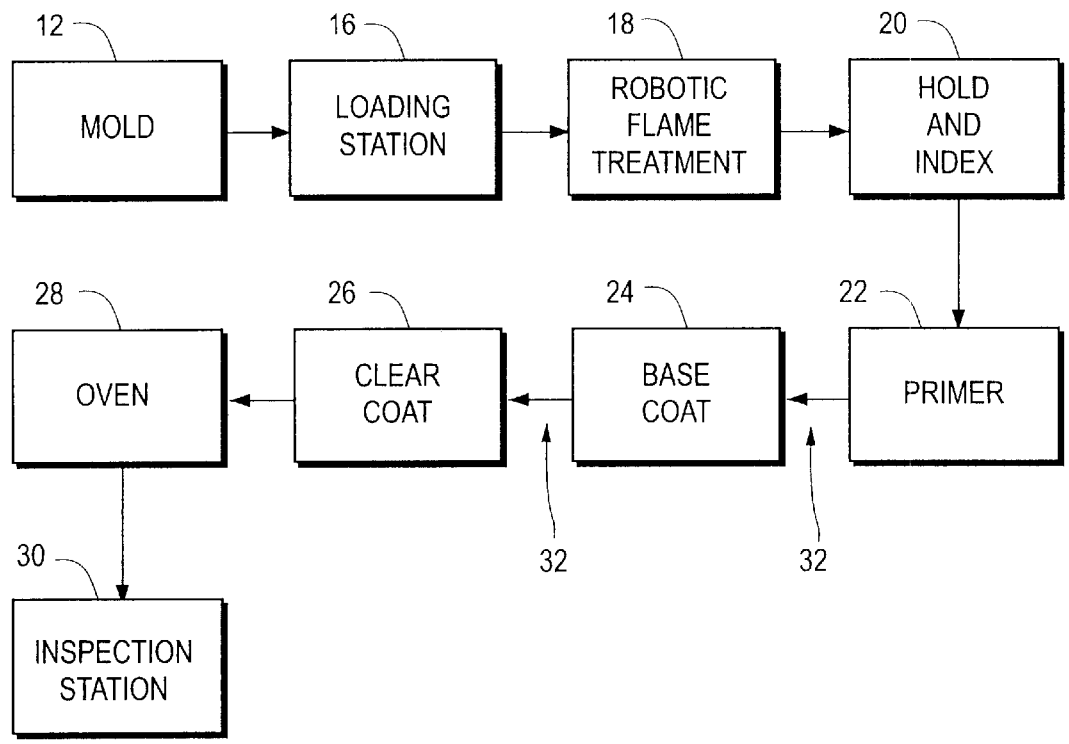
FIG. 1 is a schematic view of the method of the present invention.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of an Illustrative Embodiment") relates to a requirement of the United States Patent Office, and should not be found to limit the subject matter disclosed herein.

Referring to the drawings, FIG. 1 shows a schematic view of one embodiment of a factory 10 utilizing the method and device of the present invention. In such a factory 10, a mold 12 may be available to actually produce an item 14 or device which will be subsequently treated and painted in factory 10. Factory 10 further comprises a loading station 16, a robotic flame treatment section 18, a hold and index station 20, a primer application station 22, a base coat station 24, a clear coat station 26, an oven 28 and an inspection station 30. Each of these station will be described, in relation to the function performed, in greater detail below.

Mold 12, in one example, comprises an injection molding apparatus that is adapted to produce a variety of plastic substrate parts (item 14) that are to be treated and then painted. In a motor vehicle application of the present invention, mold 12 is adapted to produce a variety of plastic motor vehicle components such as, for example, a bumper beam, a body side molding, or the like. It should be understood by those skilled in the relevant art that mold 12 produces any plastic substrate part desired, irrespective of the application in which the plastic be utilized.

In a preferred embodiment of the factory of the present invention, a deionized air tunnel provided for sending item 14, for drying, between stations which provide coatings, such as the primer application station 22 and the base coat station 24. In this manner intermediate coating are allowed to properly dry prior to the next step in the procedure. It is to be understood that the illustrated configuration of factory 10 is one of many possible configurations, and is not intended as a limitation to the scope of the present invention. It will be understood, by those having skill in the relevant art, that such stations as clear coat station 26 and base coat station 24 can be configured so that both steps can be performed, individually, at the same station in a factory.

It is to be further understood that an item 14 to be treated in factory 10 may be constructed outside of the factory, at any location or any where, without departing from the novel scope of the present invention. In the use of the factory, item 14, which has been molded or otherwise produced, is placed onto a loading station 16, which, without departing from the novel scope of the present invention, may be a conveyor belt or system or may be a fixed device for holding item 14. In one embodiment of the procedure, item 14 is treated with a cleansing chemical wipe and is passed through deionized air tunnel 32. It is to be understood that the item 14 may be treated without being chemically wiped, or may be chemically wiped without passing through drying deionized air, without departing from the novel scope of the present invention.

Figure 2:
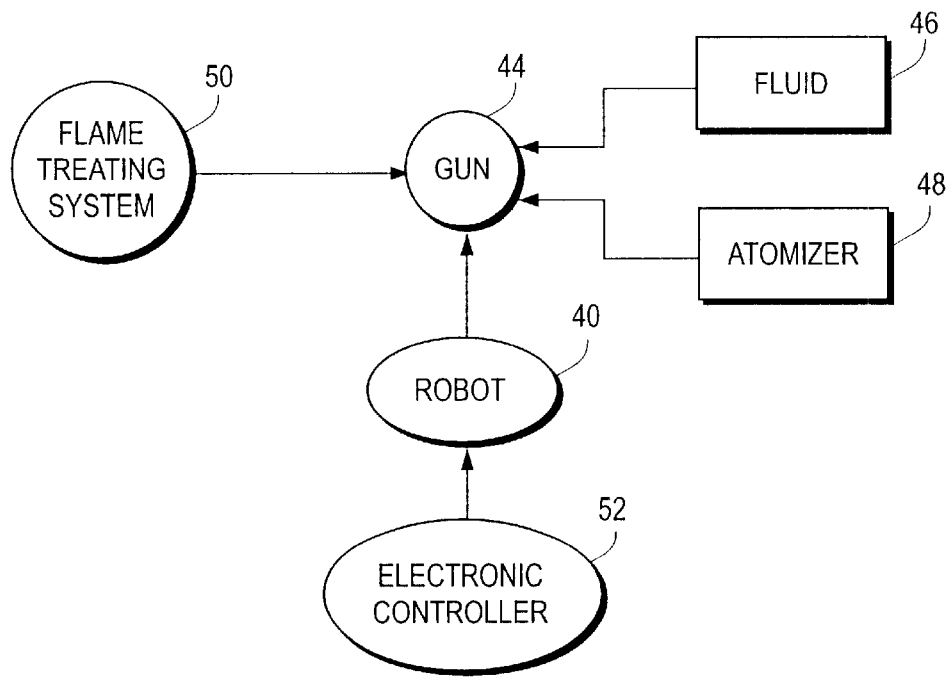
FIG. 2 is a schematic view of the operation of one embodiment of the device of the present invention.

A robotic device 40, comprising a flame treatment arm 42, as schematically shows in FIG. 2 and illustrated in FIG. 3b and FIGS. 6 through 10, traverses the length of item 14, in a manner which will be described in detail below. The treated item 14 can then be indexed, coated with primer, dried in an air tunnel using deionized air, painted with a base coat of paint, returned to an air tunnel to be dried in deionized air, and then painted with a clear coat. Subsequently, the item can be dried in an oven, or kiln, and sent to an inspection station where the results of the procedure inspected.

In a preferred embodiment, robotic device 40 generally comprises a gun 44 having fluid storage or connection means 46, a fluid atomizer 48, a flame treating system 50 and electronic control means 52, such as a computer or other processing device capable of accepting programming (not shown). In the operation of the device of the present invention, a plastic item 14 is first oxidized by a flame 62 and then treated with a grafting chemical 46, in a preferred embodiment, the grafting chemical 46 is placed almost immediately onto the area that has been oxidized, as will be described in detail below.

A preferred graft chemical that is suitable for use in connection with the present invention is a polyethylenimine that is commercially available from BASF, and that is sold under the brand name of Lupaslol® G35. In accordance with the preferred embodiment of the invention, a quantity of water is mixed with a quantity of Lupaslol® G35 in a ratio of 400:1. It should be understood, however, that other graft chemicals can be utilized in accordance with the present invention without departing from the scope thereof.

Fluid storage or connection means 46 further comprise storage and/or inlets for such fluids as grafting chemicals, colorizing chemicals, electrolytic chemicals and other chemicals as needed, as will be described in greater detail below. Referring to FIG. 3b, a perspective view of the burner 60 of the present invention is shown. It will be noticed that the flame area 62 of burner 60 is formed in a cylindrical body 61 with flame capability throughout the upper surface 64 of burner 60. It will be understood, by persons having skill in the art that the upper surface 64 of burner 60 can be constructed with a plurality of flame jets 66 so as to produce and even flame about the entirety of surface 64. As illustrated in FIG. 3b, an atomized fluid ejector 68 is included generally in the center of cylindrical body 61.

It is to be understood that fluid ejector 68 may be placed in any effective and efficient area within body 61 without departing from the novel scope of the present invention. Further, it is to be understood that while an single rod atomizer 68 is shown, any form of fluid propulsion, including a system where pressurized gas is drawn across the top of tube to draw fluid out of a container and propel the fluid towards the item 14 to be treated, may be used without departing from the novel scope of the present invention. Such devices are utilized in outside mix air brush devices and may easily be adapted to the burner 60 of the present invention without departing from thee novel scope of the present invention.

It will be seen that the burner 60 of the present invention, further comprises insertion means, 54, to bring chemicals into robotic device 40. Insertion means 54 comprises means, such as valves or other input sources, for insertion of fluids 46 and a valve through which a propellant 47 may be injected. In a preferred embodiment of the present invention the propellant 47 used is pressurized Nitrogen gas ($N_2$). It has been found that the use of the preferred propellant 47 provides the force to propel chemicals in a desired fashion while not being flammable (in the presence of flame treatment system 50) and not effecting the oxygen content of the flame in flame treatment system 50. It is to be understood that any propellant having similar properties may be employed by persons having skill in the art without departing from the novel scope of the present invention.

Referring to FIG. 3a, one example of a burner system 80 of the prior art is illustrated to allow comparison with the exemplary device of the present invention that is illustrated and disclosed in this application. It will be seen that burner system 80 includes an inlet 80A and a plurality of flame outlets 80B, and is of a flat elongated type, useful in providing surface treatment to flat sheets of materials.

Figure 4:
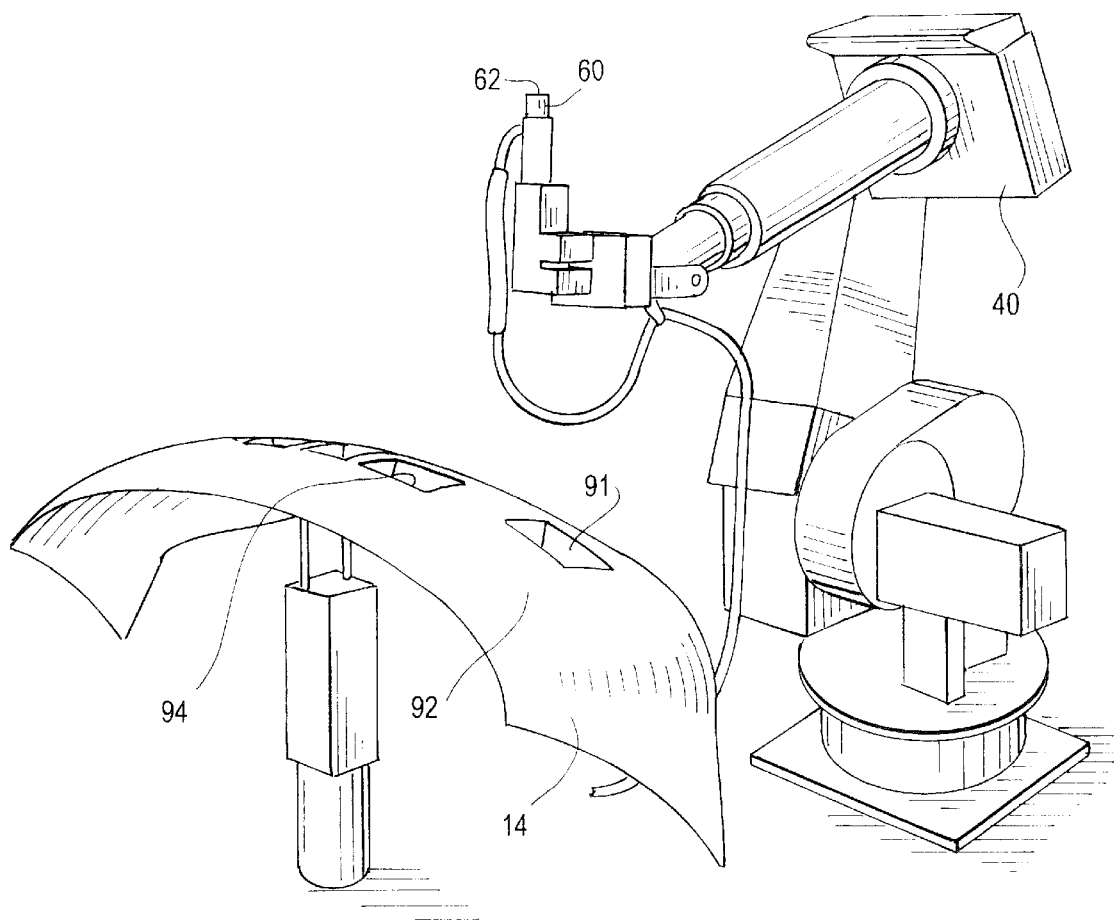
FIG. 4 is a perspective view of an item to be treated by a device of the present invention.

Referring to FIG. 4, a burner 60, having a flame area 62, of the present invention may be seen in position on a robotic device 40. Item 14, here illustrated as an automobile bumper 14, is shown in position to be treated. As shown, bumper 14 comprises a plastic material having indentations 90, undulations 92 and openings 94, among other topographical features. In order to prepare such a bumper for painting, all of the irregular topographic features must be properly coated and prepared for paint. As illustrated in FIGS. 5–10, burner 60 of the present invention may be manipulated so that flame area 62 can cover any topographic feature of bumper 14. FIG. 6 shows the shape of flame area 62 in a first ignited position.

Figure 5A:
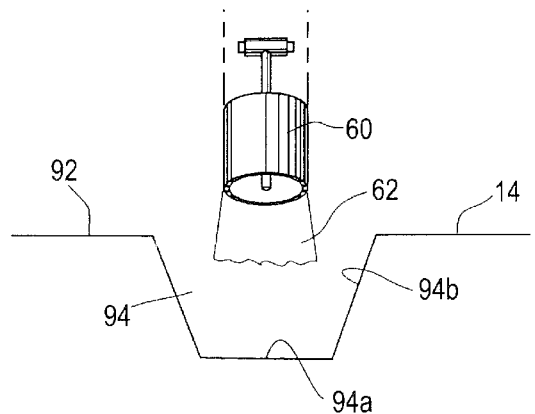
FIGS. 5a–5d is a series of diagrammatic views of the device of the present invention in use on an contoured item to be painted.
Figure 5B:
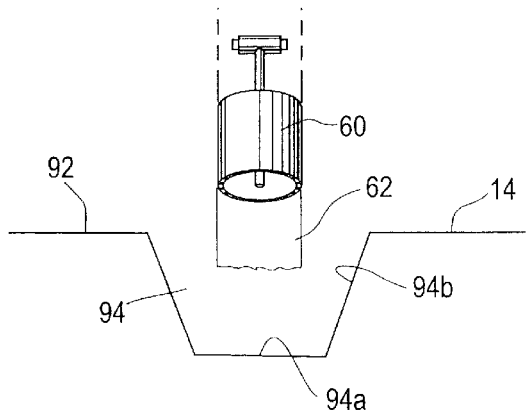
Figure 5C:
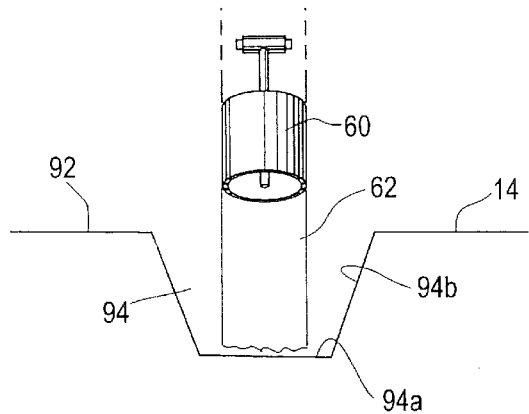
Figure 5D:
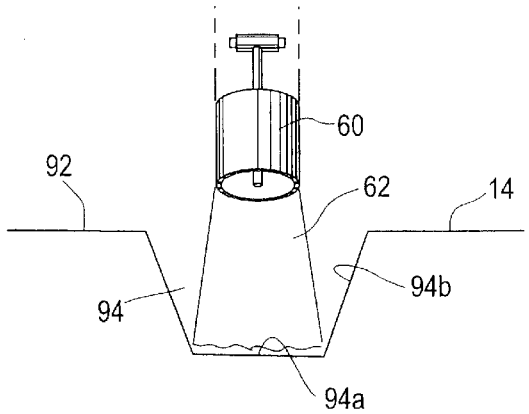

In the treatment of plastic parts, the burner is adjusted to fit the size of the area to be treated. It is to be understood that flame area 62 may be adjusted, using controls that specifically cause more or less propellant 47 at higher or lesser pressures, as is most widely recognized in the use of Bunsen burners in laboratories. Specifically, when covering flat areas (FIG. 5a and FIG. 7) flame area 62 may be made to bum with a widened flame, by decreasing propellant 47 pressure, so as to cover large areas rapidly. In the treatment of openings 94, or crevices or other topographic features of item 14, flame area 62 may be adjusted by increasing and then decreasing propellant 47 pressure. FIGS. 5b and 5c, illustrate the narrowing of flame area 62 to allow the flame tongue 63 to enter a narrow crevice 94. Once flame tongue 63 reaches the bottom 94a, of opening 94, propellant 47 pressure can be decreased causing tongue 63 to widen such that the inner surface 94b of opening 94 is touched by flame tongue 63. It is to be understood that control of the narrowing and widening of flame tongue 63 can be accomplished using electronic controller 52, such that a single accurate pass of all surface area portions of item 14 are made.

As flame tongue 63 is drawn upwards out of opening 94, flame tongue 63 licks the entire inner surface 94b of opening 94. Grafting chemicals 46, or other fluids 46, are atomized and cover the freshly oxidized surface as flame tongue 63 is withdrawn.

In accordance with a further aspect of the present invention, colored fluids 46c are injected into burner 62 such that as grafting chemicals are placed onto item 14, item 14 may be colorized so that the operators and workers can easily recognize which items have been treated. In a preferred embodiment of this aspect of the present invention, a quantity of propylene glycol and a quantity of a suitable colorizing agent (such as red die no. 55) is mixed with a quantity of a water/graft chemical mixture in a ratio of 250 parts mixture to 1 part propylene glycol and 1 part colorizing agent. It will be appreciated by those of ordinary skill in the relevant art that chemicals other than those specifically identified above may be used in connection with this aspect of the present invention disclosed herein.

In accordance with another further aspect of the present invention, electrolytic chemicals are injected into burner 62 such that as grafting chemicals are placed onto item 14, item 14 receives a small ionic charge, which will allow the subsequent painting of item 14 by electrostatic means. In a preferred embodiment of this aspect of the present invention, a quantity of a suitable electrolyte such as potassium citrate, sodium chloride, or sodium citrate is mixed with a quantity of a water/graft chemical mixture in a ratio of 10 ml (mili-liter) of electrolyte for each liter of mixture. It should be understood that other electrolytes may be utilized to allow the surface of the substrate plastic parts to be made at least partially conductive.

The present invention disclosed herein provides significant advantages over conventional systems that utilize adhesion promoters to treat substrate plastic parts to accept paint. For example, one gallon of a typical adhesion promoter is capable of treating approximately forty (40) plastic bumper beams, whereas one gallon of the graft concentrated chemical when mixed as disclosed herein is capable of treating approximately 6000 of such bumper beams. Furthermore, the present invention allows the time associated for treating each substrate plastic part to be significantly reduced. For example, a plastic bumper beam can be fully treated to accept paint in approximately forty (40) seconds in accordance with one embodiment of the present invention disclosed herein.

In accordance with a further development of the present invention disclosed herein, a robotic flame treatment apparatus may be used to spray materials other than graft chemicals such as, for example, a powder. One example of such a powder material is a chopped fiberglass slurry. In this case, a burner is controlled to move in a predetermined fashion over a mold so that so that the chopped fiberglass slurry is sprayed onto a mold and at least partially hardened by the flame provided by the burner as discussed in greater detail hereafter. This allows, for example, the manufacturing times for fiberglass articles such as, for example, row boats and pleasure craft to be significantly reduced. In motor vehicle applications of this aspect of the present invention disclosed herein, a number of different motor vehicle components such as, for example, high strength, low weight, thin gauge body panels to be manufactured.

Referring to FIG. 11, a schematic diagram of method of manufacturing glass fiber preforms is illustrated. In particular, a robotic flame treatment apparatus 200 includes a robot 202, an electronic controller 204, two chop guns 206 and 208, and a burner 210. The electronic controller 204 is programmed to cause the robot 202 to move the burner 210 and the chop guns 206 and 208 in a predetermined sequence relative to mold 212 to manufacture a glass preforms as discussed in greater detail hereafter.

The robotic flame treatment apparatus 200 generally includes the same structure as the robotic flame treatment station 18 shown in FIG. 1, except as discussed in greater detail hereafter. Instead of using a center atomizing tube together with an atomizer, a ½' tube through the housing of burner 210 is used. The tube is secured with a lock nut at the top of the burner 210 adjacent the face of burner 210. A nozzle is fit inside this tube that is compatible with spraying powder 211.

At the bottom of burner 210, a ⅜' polyethylene tube is connected. This tube is configured as a powder/air delivery line. Furthermore, the nitrogen/fluid delivery system is removed and replaced with a typical auger driven powder delivery pump. This unit requires compressed air to be connected into a venturi which in turn is fed with a constant supply of power through a frequency driven motor on the auger. The net result of this structure is a constant ratio of powder in a given air stream.

With this process, it is important to control the flame temperature to prevent the power that is sprayed from burner 210 from burning up in the flame. For this purpose, a flame treatment system (not shown) that is similar to the flame treating system 50 (FIG. 2) is operatively connected to the burner 210. The flame treating system includes a gas/air control system and an oxygen analyzer. The oxygen analyzer allows an operator to monitor and maintain the accuracy of the flame so that the flame temperature remains constant.

For example, if it is desired to "chill" the flame, the amount of combustion air used in the primary gas/air mix is increased. This causes the flame temperature to be decreased, but will be shown as an increase in oxygen content on the oxygen analyzer. Conversely, if it is desired to increase the flame temperature, then the amount of combustion air used in the primary mix is decreased, which will be shown as a drop in oxygen content on the oxygen analyzer. Set points and control loops can be set within the control panel to maintain optimum performance as readily apparent to those of ordinary skill in the relevant art.

The burner system is designed to be automated in use and mounted to a robot arm for articulation. In particular, the burner 210 is mounted on an end effector plate of an arm of robot 202. The chop guns 206 and 208 also are mounted on this end effectuator plate. Chop guns 206 and 208 are designed to produce a predetermined amount of chopped glass fiber or carbon fiber strands per unit time. The chop guns are powered by compressed air and function in a manner similar to air driven motor. A small amount of air is also used to provide "fan" air to the outgoing chop, and thus give it shape in a manner similar to a spray pattern. Changing this small amount of air, either by pressure or volume will change the shape of the fan pattern.

In the illustrated embodiment of the invention, chop guns 206 and 208 are mounted on either side of the burner 210, 180° apart from the burner 210 and angled towards a center intersect point. The center intersect point, which is the point in space relative to the burner at which the chop streams will merge together, is adjustable relative to the required output measured in pounds of chop/minute.

The apparatus discussed above can be used to manufacture various articles as discussed in greater detail hereafter. In one exemplary application of the present invention, the glass or carbon fiber is chopped at a given rate by chop guns 206 and 208, and merges together at a distance of approximately 6–12 inches from the face of burner 210. The flame is ignited and adjusted in output relative to the required lay down rate of the chop. Through the center of burner 210, a powder is "sprayed" therefrom towards the center intersect point of the chop guns 206 and 208. This powder can be, for example, a low molecular weight polyester resin, a high molecular weight polyester resin, a low molecular weight epoxy resin, or a high molecular weight epoxy resin. The choice of resin used will depend on the complexity of the pre-form being laid up together with the strength requirements required within the component.

Spraying the powder through the flame created by the burner 210 causes the powder to become "tacky" from the heat transfer with the flame. Once tacky and now inside the velocity stream of the flame, the "tacky" powder is carried to the intersect point with the glass chop and becomes mixed with the chop. This effect covers the surface of the chop material and allows the formation of a "mat" without fear of stands of fiber chop either sagging or blowing off from the surface of the pre-form. The electronic controller 204 is programmed to provide multiple layers of this slurry to build the required pre-form thickness and loft.

From the foregoing, it will also be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims when the claims are properly interpreted.

What is claimed is:

1. A method, comprising the steps of:
    mounting a gas burner assembly on an end of arm tool, said gas burner assembly including a flame jet forming ring that generally fully encloses a chamber that is defined within a body portion of said gas burner assembly, said gas burner assembly having an air/gas inlet that communicates with said chamber, said flame jet forming ring including at least one port defined therein that communicates with said chamber and that is generally annular in shape, said gas burner assembly further including a discharge tube having an inlet and an outlet, said outlet being generally peripherally surrounded by said at least one port;

feeding a pre-mixed air/gas mixture into said chamber through said air/gas inlet to cause said air/gas mixture to be generally evenly distributed throughout said chamber and said at least one port, and to cause substantially all of said air/gas mixture to flow from said air/gas inlet to ambient atmosphere through said chamber and said at least one port;

igniting said air/gas mixture to create a generally annular flame that projects from said flame jet forming ring of said gas burner assembly;

causing said end of arm tool to move said gas burner assembly with respect to a product or mold so that at least a portion of said generally annular flame is in direct contact with desired portions of the product or mold; and spraying a mixture from the outlet of said discharge tube as desired while said generally annular flame is in direct contact with the product or mold (i) so that, when said method is used to flame treat a product, at least some of said mixture is chemically bonded to at least some of the flame treated portions of the product thereby allowing a coating to be subsequently applied thereon with improved adhesion, or (ii) so that, when said method is used to manufacture a product on a mold, a product can be formed on and then removed from the mold.

2. The method of claim 1 wherein said at least one port is generally parallel with respect to a longitudinal axis of said body portion.

3. The method of claim 1 wherein said at least one port is generally circular in shape.

4. The method of claim 1 wherein said at least one port is generally concentric with a longitudinal axis of said body portion.

5. The method of claim 1 wherein said at least one port comprises two or more individual flame jet ports each of which communicates with said chamber.

6. The method of claim 1 wherein said discharge tube is generally parallel to a longitudinal axis of said body portion.

7. The method of claim 1 further comprising the step of projecting an inert gas from the outlet of said discharge tube at various velocities as desired to cause the geometry of said generally annular flame to be changed in proportion to the velocity of the inert gas that is projected from said discharge tube.

8. The method of claim 1 wherein said mixture comprises a powder, and wherein said method further comprises the step of propelling a slurry towards the surface of the product or mold while spraying said powder from said discharge tube and while causing said generally annular flame to be in direct contact with the product or mold to thereby cause a mat to be formed on desired portions of the product or mold.

9. The method of claim 8 wherein said slurry comprises a chopped fiberglass slurry.

10. The method of claim 8 wherein said powder comprises a material selected from a group consisting of: a polyester resin and/or an epoxy resin.

11. The method of claim 1 wherein said mixture comprises a liquid mixture that includes a quantity of a coupling agent at least a portion of which is chemically bonded onto an oxidized surface of a product that is created by causing said generally annular flame to directly contact the product.

12. The method of claim 11 wherein said liquid mixture further includes a quantity of a colorizing agent that causes a treated surface of the product to be a different color after it has been flame treated and sprayed with said coupling agent and said colorizing agent.

13. The method of claim 11 herein said liquid mixture further includes a quantity of electrolytes to facilitate electrostatic painting of a treated surface of the product after it has been flame treated and sprayed with said coupling agent and said electrolytes.

14. The method of claim 11 wherein said coupling agent comprises a multi-functional organic compound.

15. The method of claim 14 wherein said multi-functional organic compound comprises polyethylene imine.

* * * * *

UNITED STATES PATENT AND TRADEMARK OFFICE
CERTIFICATE OF CORRECTION

PATENT NO. : 6,582,773 B2
DATED : June 24, 2003
INVENTOR(S) : Brynolf

It is certified that error appears in the above-identified patent and that said Letters Patent is hereby corrected as shown below:

<u>Title page,</u>
Item [73], Assignee, should read -- FTS, LLC, Flint, MI --

<u>Column 1,</u>
Line 45, the word "material" should be changed to -- materials --
Line 55, the words "none of" should be inserted before the word -- these --

<u>Column 2,</u>
Line 4, a period should be inserted after the word "plastic"
Line 5, the word "chemical" should be changed to -- chemicals --
Line 12, the word "with" should be changed to -- which --
Line 25, the word "undulation" should be changed to -- undulations --
Line 44, a comma should be inserted between the words "and" and "generally"
Line 50, the word "part" should be changed to -- parts --

<u>Column 3,</u>
Line 38, the word "on" should be changed to -- in --

<u>Column 4,</u>
Line 14, the words "substrate part is to" should be inserted between the words "plastic" and "be"
Line 16, the phrase "32 is" should be inserted between the words "tunnel" and "provided"
Line 54, the words "can be" should be inserted between the words "procedure" and "inspected"

<u>Column 5,</u>
Line 25, the phrase "an single rod" should read -- a single rod --
Line 33, the word "thee" should be changed to -- the --
Line 36, the comma after the word "means" and before the number "54" should be removed <u>Column 7,</u>
Line 11, the phrase "so that so that" should read -- so that --
Line 28, should read -- to manufacture glass preforms -- OR -- to manufacture a glass preform --
Line 33, "1/2 (foot) tube" should be changed to -- 1/2 (inch) tube --

UNITED STATES PATENT AND TRADEMARK OFFICE
CERTIFICATE OF CORRECTION

PATENT NO. : 6,582,773 B2
DATED : June 24, 2003
INVENTOR(S) : Brynolf

It is certified that error appears in the above-identified patent and that said Letters Patent is hereby corrected as shown below:

Column 7 (cont'd),
Line 39, "3/8 (foot) polyethylene tube" should be changed to -- 3/8 (inch) polyethylene tube"
Line 49, the word "power" should be changed to -- powder --

Column 10,
Line 32, the word "herein" should be changed to -- wherein --

Signed and Sealed this

Fourteenth Day of October, 2003

JAMES E. ROGAN
*Director of the United States Patent and Trademark Office*